Dec. 5, 1967  C. L. SMALL  3,356,385
SHEAR SPRING SUSPENSION
Filed April 8, 1966  2 Sheets-Sheet 1
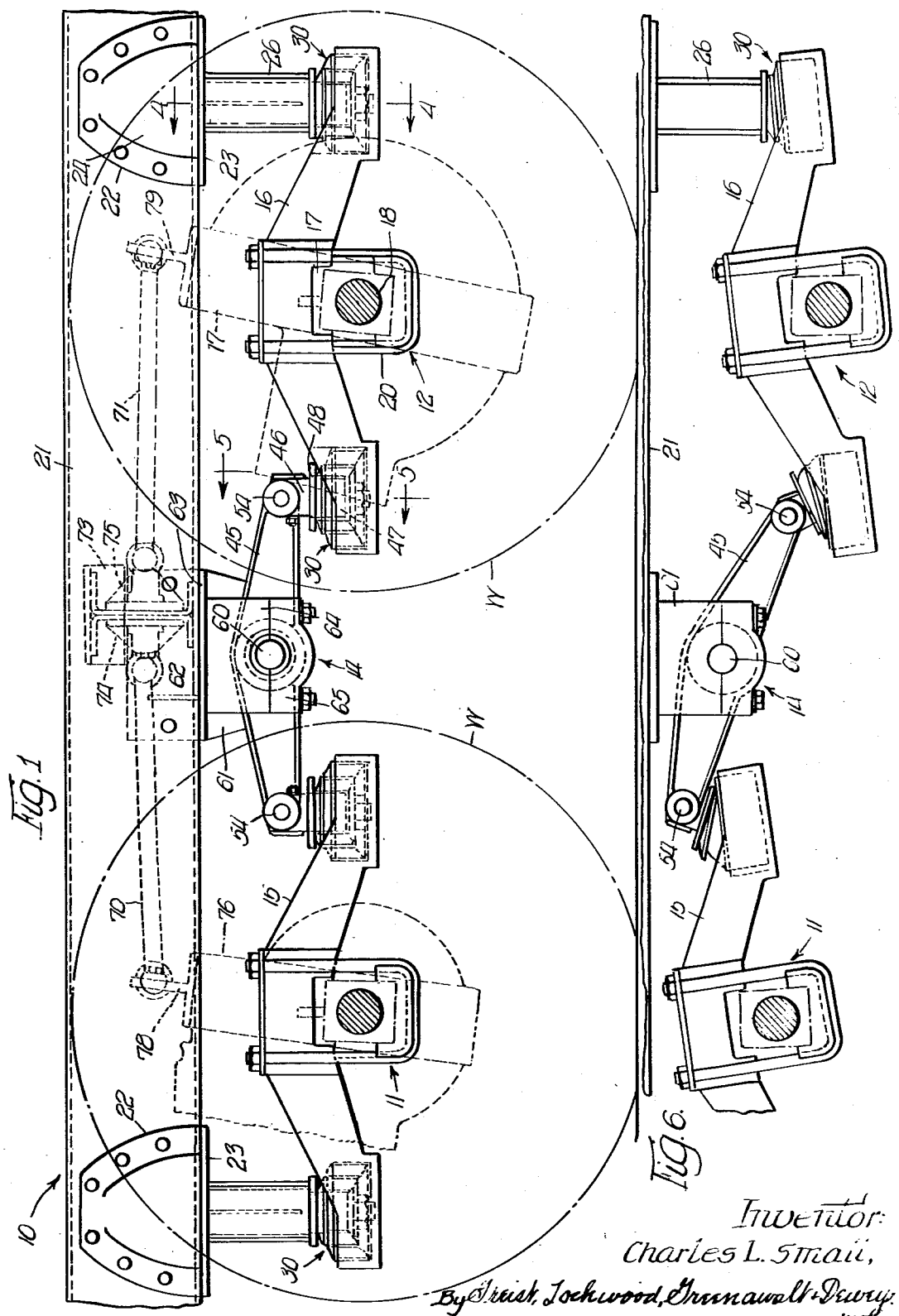

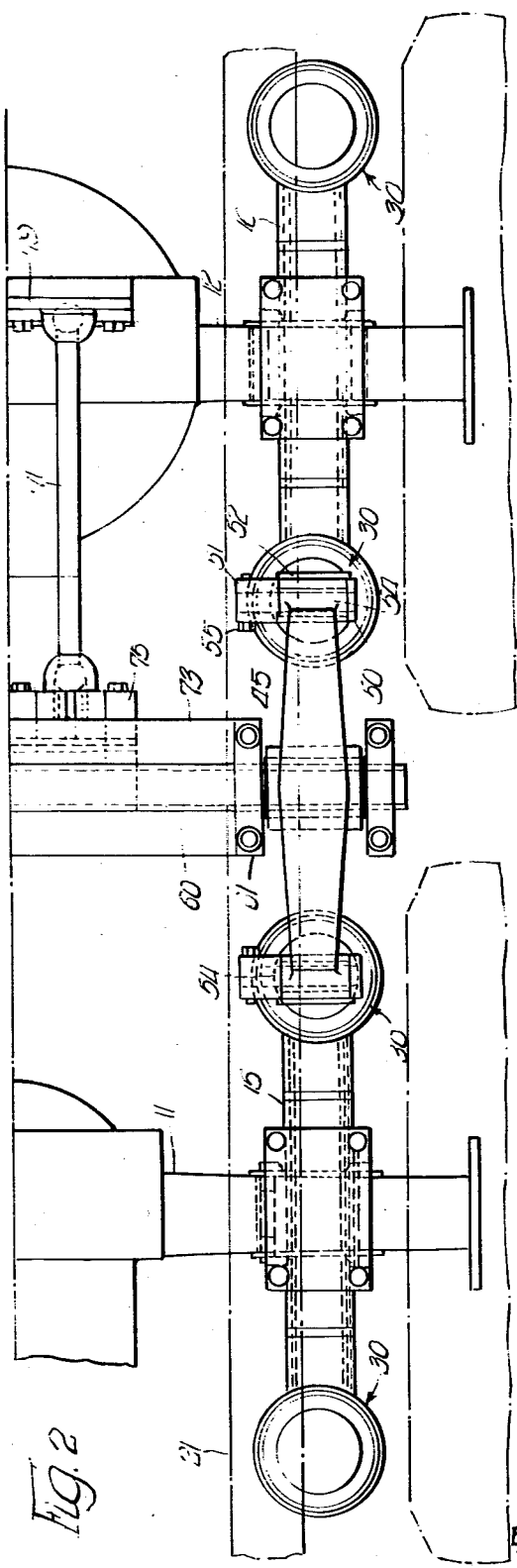

United States Patent Office 3,356,385
Patented Dec. 5, 1967

3,356,385
SHEAR SPRING SUSPENSION
Charles L. Small, Chicago, Ill., assignor to Hendrickson Mfg. Co., Lyons, Ill., a corporation of Illinois
Filed Apr. 8, 1966, Ser. No. 541,336
9 Claims. (Cl. 280—104.5)

This invention relates to mounting systems for suspending from wheel bearing axles the frame of a road vehicle such as a tractor or trailer and is more particularly concerned with innovations and improvements in a suspension system wherein rubber or rubber-like material is employed in place of metallic springs to provide the desired resiliency in the connections between the frame and the axles.

Axle suspension systems for vehicles have been developed heretofore which employ resilient mountings of rubber or rubber-like material connecting the vehicle frame with a single or tandem axle assembly. One such suspension system which has been developed and used successfully is described in Patent No. 2,980,439, granted Apr. 18, 1961, to R. E. Miller and a general object of the present invention is to provide an improved suspension system for tandem wheel and axle assemblies of trucks and trailers wherein resilient mountings are relied upon to connect the vehicle frame to rigid beams on which the wheel and axle assemblies are carried so as to absorb both the vertical and horizontal stresses without frictional engagement of metal surfaces between which wear can take place.

It is a more specific object of the invention to provide a new and improved vehicle suspension system which can be used on a tractor with drive axles and also on a trailer with trailer axles, which is designed to mount on conventional spring pads utilizing attaching and clamping members normally supplied to mounting spring installations, and which is specially adapted to tandem running gear having two spaced independently sprung axles with load equalizing connections so that in normal road operation the load will be substantially equalized on the two axles.

Another object of the invention is to provide an improved tandem axle suspension wherein the wheel and axle assemblies are carried on rigid means, the opposite ends of which are connected with the vehicle frame and with one end of a pivotally mounted rigid equalizing trunnion or load balancing beam, respectively, the axle beams and the load balancing beams extending longitudinally of the vehicle frame in paired relation at each side thereof, with the load balancing beams each being mounted on the vehicle frame intermediate an associated pair of axle beams and having connections with the axle beams which include a bracket pivoted to the end of the balancing beam and a resilient suspension unit forming a positive connection of the bracket with the end of the axle beam so as to permit predetermined oscillation of the balancing beam while maintaining a permanent resilient connection with the axle beam.

A further object of the invention is to provide an improved tandem running gear embodying two spaced, independently sprung axles having connections with the vehicle frame for distributing the load equally on the two axles during normal road operation which includes rigid load balancing beams pivoted beneath the vehicle frame and extending between adjacent ends of rigid axle carrying beams at opposite sides of the vehicle and springless stress absorbing resilient connecting devices between the ends of the load balancing beams and adjacent ends of the axle carrying beams and between the opposite ends of the axle carrying beams and the vehicle frame so as to constitute an eight point resilient suspension system which is devoid of any wear producing sliding contact at the connecting points for the axle carrying beams.

A still further object of the invention is to provide a tandem suspension system of the type described which includes torque rods connecting the axle housings to the vehicle frame so as to hold the axle housings against rotation due to the torque resulting from driving and braking operations.

Another object of the invention is to provide a new and improved suspension of the character described utilizing resilient suspension components formed of rubber or rubber-like material which are relatively simple to produce and install, which are economical as to initial cost, which do not require lubrication and which have a relatively long life and are readily replaceable when necessary with minimum labor costs.

These and other objects and advantages of the invention will be apparent from a consideration of the tandem suspension system which is shown by way of illustration in the accompanying drawings wherein:

FIGURE 1 is a side elevational view, partly broken away, showing one side of a tandem rear axle suspension system for a tractor or trailer which embodies the invention;

FIGURE 2 is a fragmentary top plan view showing one half of the suspension system of FIGURE 1;

FIGURE 3 is a partial rear elevational view of the suspension system shown in FIGURE 1, with certain parts being omitted or broken away;

FIGURE 4 is a cross section taken on the line 4—4 of FIGURE 1;

FIGURE 5 is a cross section taken on the line 5—5 of FIGURE 1 to an enlarged scale; and FIGURE 6 is a partial side elevational view similar to FIGURE 1, with portions broken away and with the suspension beams in a different position.

For the purposes of illustration, the invention is shown herein as embodied in a tractor or trailer-type vehicle, with a bottom frame, the rear end of which is supported by the tandem 10 which includes front axle assembly 11 and a rear axle assembly 12 spaced therefrom and a connecting balancing beam assembly 14. Double wheels W are rotatably mounted at each end of each of the axle assemblies 11 and 12 and each axle assembly has attached adjacent each end thereof a rigid beam indicated at 15 and 16 in FIGURE 1. Since these beams which are at the end of each axle and on each side of the vehicle are identical and are attached in an identical manner to the axle assembly and associated elements only one will be described in detail.

The axle assembly 12 is clamped to the rigid end beam 16 intermediate the ends of the beam by means of upper and lower clamp plates 17 and 18 and co-operating U-bolts 20. The beam 15 is located beneath the side frame channel 21 so as to provide clearance for the usual brake elements and the like with which vehicles of this type are normally supplied.

The beam 16 is connected at its rearmost end to the frame side channel 21 by a frame hanger assembly 22. Each hanger assembly 22 includes a vertical plate portion 23 disposed against the vertical web portion of the frame channel 21 and a disc portion 23' at the lower end thereof disposed against the bottom horizontal flange portion of the channel 21. An outwardly curved bracing portion 24 extends between the vertical plate portion 22 and the outwardly projecting portion of the disc 23'. A rigid sleeve section 26 depends from the bottom disc 23' and a hanger pin 27 projects below the bottom end plate 28 on the sleeve section which forms a part of the resilient connection unit 30 for tying thereto the end of the axle beam 16. The resilient connection or suspension unit 30 is composed of three concentrically arranged sleeve members 31, 32 and 33, formed of metal or other rigid material, and two resilient sleeve members 34 and 35 formed of rubber or rubber-like material. The innermost resilient sleeve member 34 is disposed between the innermost rigid sleeve member 31 and the intermediate rigid sleeve member 32 while the outer resilient sleeve member 35 is disposed between the intermediate rigid sleeve member 32 and the outer rigid sleeve member 33. The resilient sleeve members 34 and 35 are permanently united or bonded to the rigid sleeve members 31, 32 and 33 so as not to separate therefrom even under high separating forces. The outer rigid sleeve member 33 is formed of a size to fit within the socket forming bore 36 at the end of the beam 16 and to rest on the inwardly turned bottom shoulder 37 while the inner rigid sleeve member 31 is formed of a size to fit on the tubular pin end 27. The upper ends of the rigid sleeve members 31, 32 and 33 are disposed at different vertical levels and as shown in FIGURE 4 are normally in a downwardly stepped arrangement from the inner sleeve 31 to the outer sleeve 33. The resilient unit 30 is clamped on the pin 27 by means of a clamping washer 38 and a lock nut 39 on the threaded end of the pin 27, the latter being of reduced cross section. The unit is seated in the bore 36 in the beam 15 with the outer rigid sleeve 33 secured therein and supported on the inwardly turned shoulder 37 at the lower end of the bore 36.

At the other or forward end of the rear axle beam 16 a resilient connecting unit, which may be of the same construction as the unit 30, connects the end of the beam 16 to the end of a rigid balancing beam or equalizing trunnion member 45. This connection includes a hanger bracket 46 which has a pin member 47, corresponding to the pin member 27, depending from the lower bracket plate 48 on which the resilient suspension unit 30 is secured and seated in the pocket formation 36 in the front end of the beam 16 in the same manner as the suspension unit 30 in the rear end of the beam 16. A pair of trunnion forming ears 50 and 51 extend upwardly of the bracket plate 48 and are connected by a vertical cross plate 52. The ears 50 and 51 are spaced to accommodate a sleeve member 53 on the end of the balancing beam 45 through which a connecting pivot pin 54 extends to couple the bracket 46 to the beam 45, the pin 54 being held against withdrawal by a bolt 55 in the one trunnion ear 51.

The load equalizing or balancing beam or trunnion 45 is pivotally supported on the end of a cross bar or transverse shaft 60 which is in turn supported in a hanger bracket 61. The trunnion mounting hanger bracket 61 comprises a vertical plate member 62 adapted to be bolted or otherwise secured to the outside face of the web of the side frame member 21 and a horizontally disposed bottom plate 63 which seats against the bottom flange of the frame member 21. A pair of bearing forming ears 64 depend from the bottom plate 63 with associated bottom clamp portions 65 which are employed to clamp the end of the cross pivot bar 60 so that the load balancing beam 45 is pivoted intermediate its ends and midway between the pivot pins 54 connecting the beam 45 with the front end of the rear axle beam 16 and the rear end of the front axle beam 15.

The front axle beam 15 is connected to the front axle assembly 11 in the same manner as described with reference to the connection between the beam 16 and the rear axle assembly 12. The front end of beam 16 is connected to the frame channel 21 by a hanger assembly 22 and a resilient suspension unit 30 in a manner which is identical with the connection of the rear end of the axle beam 16 with the frame channel member 21. The rear end of the front axle beam 15 is connected to the front end of the load balancing beam 45 by pivot 54 and suspension unit 30 in a manner which is identical with the connection between the front end of the axle beam 16 and the rear end of the balancing beam 45.

The resilient suspension units 30, which form connections at eight points between the axle beams and vehicle frame partly through the load balancing beams, permit swinging movement of the beams 45 so as to balance the load on the axles while permitting the axles to move in response to changing contour of the surface on which the wheels are riding. The connecting units 30 permit limited arcuate movement of the pivot points 54 at the ends of the balancing beam 45 about the pivot shaft 60 without any sliding contact between the parts while maintaining a positive non-sliding connection with the vehicle frame at the opposite ends of the axle beams so that the axle assemblies 11 and 12 rise and fall as the wheels encounter bumps or other unevenness in the surface over which they travel and the load is transferred smoothly to the axle assemblies through the eight suspension points.

A pair of torque rods 70 and 71 of conventional construction are mounted between the axle housings 11, 12 and a cross frame member 73 (FIGURE 4). The torque rods 70 and 71 are located above the tandem axle assembly and each of the rods 70 and 71 is attached to the cross frame member 73 by a straddle mount indicated at 74 and 75 while the opposite end of each rod 70 and 71 is connected to the top of a differential housing 76 and 77 by a similar straddle mount indicated at 78 and 79. The torque rods 70 and 71 serve to control the reaction of the axles to driving and braking operations while the vehicle is in motion which exert forces tending to rotate the housings about their axes.

In the form of the invention illustrated the ends of the axle beams 15 and 16 are connected to the vehicle frame channel 21 and the load balancing beam 45 by resilient suspension units 30 of the type which comprises a relatively thick rubber sleeve placed between two concentric rigid members of metal or the like with the outer member externally supported and the inner member movable axially with respect to the outer member and acted upon by the load. This type of resilient connection permits movement of the axle beams to balance the load and at the same time affords a permanent frictionless connection between the members. Another form of resilient connecting unit which it may be desired to employ under certain conditions is disclosed in Patent No. 2,702,702, granted to Renato Piragino and dated Feb. 22, 1955. This type of resilient connecting unit also permits the desired rocking movement of the load balancing beam 45 while maintaining a positive connection between the pivot points at the ends of the equalizing beam and the ends of the axle beams thereby affording adequate flexibility for axle articulation due to road irregularities. This type of connecting unit can be made sufficiently rugged to handle efficiently stresses generated by the load and the passage of the wheels over bumps or other road irregularities so as to improve the vehicle ride and increase the stability of the vehicle while it is in motion.

While particular materials and specific details of construction have been referred to in describing the form of the suspension illustrated, it will be understood that other materials may be employed and certain changes made in the construction and arrangement of the suspension without departing from the scope of the invention as defined in the appended claims.

I claim:

1. A vehicle suspension adapted to be interposed between a vehicle frame and a pair of tandem axles each having wheels journaled on opposite ends thereof, said suspension comprising a rigid load balancing beam pivotally connected intermediate its ends to said frame between said axles and adapted to oscillate about an axis generally parallel with said axles, a rigid beam disposed longitudinally of the vehicle frame and secured intermediate its ends to each end of each axle, bracket means providing rigid pins depending from the vehicle frame at each side thereof and in longitudinally spaced relation, a resilient suspension unit connecting the forward end of the front axle beam and the rearward end of the rear axle beam to said depending pins and connecting means between the ends of said load balancing beam and the rearward and forward ends of said front and rear axle beams, respectively, each said beam connecting means including a hanger bracket pivotally mounted adjacent the end of the balancing beam and a resilient suspension unit connecting the hanger bracket and the end of the axle beam whereby eight resilient connecting points are provided between the vehicle frame and the axles for absorbing and transferring vertical and horizontal stresses resulting from wheel contact with uneven roadway surfaces.

2. A resilient axle suspension adapted to be interposed between each side of a vehicle frame and axle support means therefor comprising a pair of axle assemblies in tandem arrangement having supporting wheels journaled at opposite ends thereof and a rigid beam adjacent each end of each axle assembly which is connected to the axle assembly intermediate its ends and extends longitudinally of the vehicle frame, the front end of the front axle beam and the rear end of the rear axle beam at each side of the vehicle being connected directly to the underside of the vehicle frame by a resilient suspension unit and having the adjacent ends of the axle beams connected by like resilient suspension units to bracket members which are pivoted at opposite ends of a load balancing beam, the balancing beams being connected for swinging movement on a cross pivot parallel with the wheel supporting axles and each said resilient suspension unit permitting relative vertical and horizontal movement to a limited degree during the transfer of stresses between the respective members without separation thereof.

3. An axle suspension adapted to be interposed between a vehicle frame and a pair of axles each having wheels journaled at the ends thereof, comprising an elongate rigid load balancing beam pivotally connected to said frame between said axles and adapted to oscillate about an axis generally parallel with said axles, an elongate rigid beam secured at each end of each axle, hanger brackets providing rigid pins depending from the vehicle frame at each side thereof and in longitudinally spaced relation, resilient means connecting said pins to the forward end of the front axle beam and to the rearward end of the rear axle beam and resilient means providing positive, non-sliding, non-separating connections between the ends of said load balancing beam and the adjacent ends of said axle beams.

4. An axle suspension as recited in claim 3, and said rigid beams extending longitudinally of the vehicle frame on opposite sides thereof with the resilient connections between the foremost and rearmost ends of the beams on each side of the vehicle and the frame constituting positive connections which permit hinging movements of the axle beams.

5. An axle suspension as recited in claim 4, and said load balancing beam extending longitudinally of the vehicle frame between a pair of said axle beams, and the resilient connections between the ends of said load balancing beam and the ends of the axle beams each including a rigid bracket pivotally connected to one of the beams and having a pin extending therefrom with a sleeve of rubber-like shear resisting material connecting said pin and an axle beam.

6. An axle suspension as recited in claim 3, and a load balancing beam extending on each side of the vehicle frame with opposite ends thereof having a pivotal connection with a hanger bracket which includes a depending pin and a sleeve member of rubber-like shear resisting material connecting the pin and the adjacent end of an axle beam.

7. An axle suspension as recited in claim 3, and said resilient means for connecting the ends of the axle beams to the other members including a sleeve member of rubber-like shear resistant material having its outside face secured to a beam member and its inside face secured to the associated member.

8. An axle suspension as recited in claim 3, and said resilient means for connecting the ends of the axle beams to the other members including a relatively thick, cylindrical member of rubber-like resilient material having substantial resistance to high shear stress with its outer face secured in a pocket provided in the end of the axle beam and with its inner face encompassing and connected to a rigid pin depending from the associated member.

9. An axle suspension as recited in claim 3, and said resilient means for connecting the ends of the axle beams to the other members including concentrically arranged, alternately disposed sleeve members of rigid and resilient material having substantial resistance to high shear loads which sleeve members are secured together with the outermost sleeve member secured in a pocket provided in the end of an axle beam and with the innermost sleeve member secured to a rigid pin depending from the associated member and received within said innermost sleeve member.

References Cited

UNITED STATES PATENTS

| | | | |
|---|---|---|---|
| 1,928,860 | 10/1933 | Marcum | 280—104.5 |
| 2,980,439 | 4/1961 | Miller | 280—104.5 |

BENJAMIN HERSH, *Primary Examiner.*

P. GOODMAN, *Assistant Examiner.*